(12) United States Patent
Kanada

(10) Patent No.: US 11,749,008 B2
(45) Date of Patent: *Sep. 5, 2023

(54) IMAGE PROCESSING APPARATUS AND IMAGE PROCESSING PROGRAM

(71) Applicant: SEIKO EPSON CORPORATION, Tokyo (JP)

(72) Inventor: Kentaro Kanada, Ina (JP)

(73) Assignee: SEIKO EPSON CORPORATION, Tokyo (JP)

(*) Notice: Subject to any disclaimer, the term of this patent is extended or adjusted under 35 U.S.C. 154(b) by 180 days.

This patent is subject to a terminal disclaimer.

(21) Appl. No.: 17/248,322

(22) Filed: Jan. 20, 2021

(65) Prior Publication Data

US 2021/0142094 A1 May 13, 2021

Related U.S. Application Data

(63) Continuation of application No. 16/226,034, filed on Dec. 19, 2018, now Pat. No. 10,936,896.

(30) Foreign Application Priority Data

Dec. 26, 2017 (JP) ................................. 2017-249294

(51) Int. Cl.
*G06F 40/10* (2020.01)
*G06V 30/416* (2022.01)
(Continued)

(52) U.S. Cl.
CPC ............ *G06V 30/416* (2022.01); *G06F 40/10* (2020.01); *G06V 30/153* (2022.01); *G06Q 10/04* (2013.01);
(Continued)

(58) Field of Classification Search
CPC .............. G06K 9/344; G06K 9/00469; G06K 9/00449; G06K 2209/01; G06F 40/10; G06Q 10/04; G06Q 10/10
See application file for complete search history.

(56) References Cited

U.S. PATENT DOCUMENTS 6,611,598 B1 * 8/2003 Hayosh ................ G06Q 20/401
380/54
2005/0195446 A1 9/2005 Kasatani
(Continued)

FOREIGN PATENT DOCUMENTS

JP 3084490 U 3/2002
JP 2008071050 A 3/2008
(Continued)

OTHER PUBLICATIONS

Anonymous: "Date Matching in hazel—MyProductiveMac", Sep. 29, 2015, URL:http://www.myproductivemac.com/blog/dat-matching-i n?hazel2992015 [retrieved on Apr. 12, 2019] (4 pages).
(Continued)

*Primary Examiner* — Shefali D Goradia
(74) *Attorney, Agent, or Firm* — CHIP LAW GROUP

(57) ABSTRACT

An image processing apparatus includes a processor that acquires document image data that is generated by reading an original document and recognizes character strings that are included in the document image data through character recognition, and the processor selects, as an issuing date of the original document, date information that includes time information from among a plurality of date information pieces in a case in which the plurality of date information pieces are extracted from among the character strings. The processor distinguishes a type of the original document on the basis of the document image data and selects date information as an issuing date of the original document from among the plurality of date information pieces in accordance with the type of the original document in a case in which no date information that includes time information has not been extracted.

8 Claims, 7 Drawing Sheets

(51) Int. Cl.
  *G06V 30/148* (2022.01)
  *G06Q 10/04* (2023.01)
  *G06Q 10/10* (2023.01)
  *G06V 30/10* (2022.01)
  *G06V 30/412* (2022.01)

(52) U.S. Cl.
  CPC ............ *G06Q 10/10* (2013.01); *G06V 30/10* (2022.01); *G06V 30/412* (2022.01)

(56) References Cited

U.S. PATENT DOCUMENTS

| | | | |
|---|---|---|---|
| 2007/0118569 A1* | 5/2007 | Kishi | G06F 16/93 |
| 2014/0093170 A1 | 4/2014 | Ohguro | |
| 2015/0012339 A1* | 1/2015 | Onischuk | G07C 13/00 |
| | | | 235/386 |
| 2016/0301825 A1* | 10/2016 | Terao | G06V 10/10 |
| 2017/0351913 A1* | 12/2017 | Chen | G06V 30/412 |

FOREIGN PATENT DOCUMENTS

| | | |
|---|---|---|
| JP | 2015118488 A | 6/2015 |
| JP | 2016035690 A | 3/2016 |

OTHER PUBLICATIONS

Extended European Search Report issued in European Application No. 18215839.4 dated May 23, 2019.

Palm et al., "CloudScan—A configuration-free invoice analysis system using recurrent neural networks," arxiv.org, Cornell University Library, 201 Olin Library Cornell University Ithaca, NY, Aug. 24, 2017 (8 pages).

* cited by examiner

IMAGE PROCESSING APPARATUS AND IMAGE PROCESSING PROGRAM

CROSS REFERENCE TO RELATED APPLICATIONS

The present application is a continuation application of U.S. patent application Ser. No. 16/226,034, filed Dec. 19, 2018, which claims priority from Japanese Patent Application No. 2017-249294, filed Dec. 26, 2017. Each of the above-referenced applications is hereby incorporated herein by reference in its entirety.

BACKGROUND

Technical Field

The present invention relates to an image processing apparatus and a non-transitory computer-readable computer medium storing an image processing program that process document image data that is generated by reading an original document.

Related Art

A configuration of an information processing terminal apparatus that automatically generates a file name for image data that is generated by reading an original document in a specific form, in which recognition processing is performed on data of designating a plurality of recognition locations designated for each form in advance, and character strings at the recognized plurality of locations are coupled via sectioning characters, thereby generating a file name, is disclosed (see JP-A-2008-71050).

However, a plurality of date information pieces may be extracted when character recognition processing is performed on document image data in some cases. It is difficult to distinguish which of the date information pieces indicates an issuing date of the original document of the document image data when such a plurality of date information pieces are extracted.

SUMMARY

An advantage of some aspects of the invention is to provide an image processing apparatus and an image processing program that appropriately select an issuing date of an original document when a plurality of date information pieces are extracted through character recognition performed on document image data.

According to an aspect of the invention, there is provided an image processing apparatus including: a control unit that acquires document image data that is generated by reading an original document and recognizes character strings that are included in the document image data through character recognition, in which the control unit selects, as an issuing date of the original document, date information that includes time information from among a plurality of date information pieces in a case in which the plurality of date information pieces are extracted from the character strings.

With this configuration, in a case in which a plurality of date information pieces are extracted from the character strings that are included in the document image data, and if date information including time information is included, the image processing apparatus selects the date information including the time information as the issuing date. In this manner, it is possible to appropriately select the issuing date of the original document from among the plurality of date information pieces when the plurality of date information pieces are extracted through the character recognition performed on the document image data.

In the apparatus, the control unit may distinguish a type of the original document on the basis of the document image data and select date information as the issuing date of the original document from among the plurality of date information pieces in accordance with the type of the original document in a case in which no date information that includes time information has not been extracted.

With this configuration, the image processing apparatus can appropriately select the issuing date of the original document from among the plurality of date information pieces in accordance with the type of the original document in a case in which the date information including the time information has not been selected for some reasons, such as a case in which there is no date information including time information from among the plurality of date information pieces that are extracted from the character strings included in the document image data.

In the apparatus, the control unit may distinguish the type of the original document on the basis of the character strings included in the document image data. In the apparatus, the control unit may distinguish the type of the original document on the basis of a size of the original document indicated by the document image data.

With this configuration, the image processing apparatus can appropriately distinguish the type of the original document on the basis of the document image data.

In the apparatus, the control unit may select, with priority, old date information from among the plurality of date information pieces in a case in which the type of the original document is a receipt.

On a receipt, various kinds of date information related to a campaign for a product, advertisement, an expiration date of points, for example, in addition to an issuing date of the receipt may be described in some cases. It is possible to appropriately select the issuing date of the original document (receipt) by selecting older date information with priority in such a situation.

In the apparatus, the control unit may select, with priority, new date information from among the plurality of date information pieces in a case in which the type of the original document is a receipt of an accommodation facility.

On a receipt of an accommodation facility, check-in date information and check-out date information are basically described. In such a situation, it is possible to select the check-out date as the issuing date of the original document (the receipt of the accommodation facility) by selecting the new date information from among the plurality of date information pieces with priority.

In the apparatus, the control unit may exclude, from options, date information that is described along with a character string that limits a period.

Since a probability that the date information that is described along with a character string with a meaning of limiting a period corresponds to the issuing date of the original document is low, it is possible to avoid selection of inappropriate date information as the issuing date of the original document by not selecting such date information.

In the apparatus, the control unit may exclude, from options, date information that is newer than date and time of generation of the document image data.

Since date information that is newer than the date and time of generation of the document image data cannot correspond to the issuing date of the original document, it is possible to avoid selection of inappropriate date information as the issuing date of the original document by not selecting such date information.

In the apparatus, the control unit may cause a display unit to display a file name that includes the issuing date as a file name of the document image data.

With this configuration, the image processing apparatus presents, to a user, a file name that includes date information that is extracted from the character strings included in the document image data as the issuing date of the original document. Therefore, the user can save the document image data with the file name including the issuing date of the original document merely by approving the file name presented (displayed on the display unit).

The technical idea of the invention is also realized outside the category of the image processing apparatus. According to another aspect of the invention, there is provided an image processing program that causes a computer to execute processing on document image data that is generated by reading an original document, the processing including: executing a control function of recognizing character strings that are included in the document image data through character recognition, in which the control function selects, as an issuing date of the original document, date information that includes time information from among a plurality of date information pieces in a case in which the plurality of date information pieces are extracted from among the character strings. An invention of a method corresponding to the processing realized by such an image processing program and a computer readable storage medium that stores the program therein can also be established as inventions.

BRIEF DESCRIPTION OF THE DRAWINGS

The invention will be described with reference to the accompanying drawings, wherein like numbers reference like elements.

FIG. 5A is a diagram illustrating a modification example of Step S120 while

DESCRIPTION OF EXEMPLARY EMBODIMENTS

Hereinafter, an embodiment of the invention will be described with reference to the respective drawings. Note that the respective drawings are just illustrative examples for describing the embodiment.

1. OUTLINE DESCRIPTION OF APPARATUS CONFIGURATION

Figure 1:
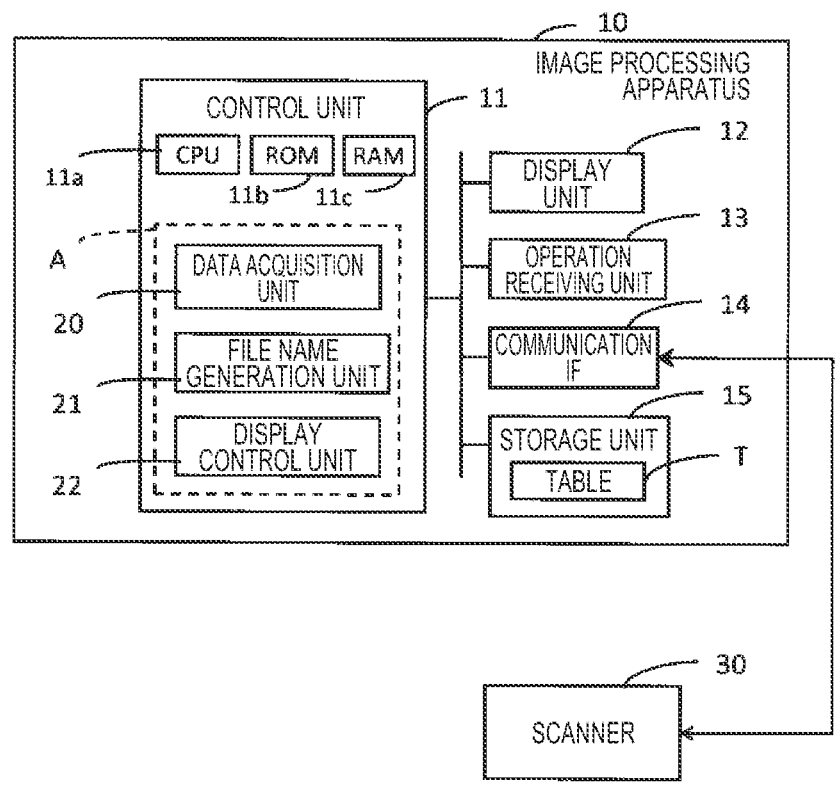
FIG. 1 is a diagram simply illustrating a configuration of an image processing apparatus.

FIG. 1 simply illustrates a configuration of an image processing apparatus 10 according to the embodiment. The image processing apparatus 10 is connected, in a communicable manner, to a reading device (scanner 30) that optically reads an original document, generates image data in a predetermined format as a result of the reading, and outputs the image data to the outside. The scanner 30 may be any device that functions as a scanner including a known product.

The image processing apparatus 10 is realized by a personal computer (PC), a smartphone, a tablet terminal, a mobile phone, or an information processing apparatus that has equivalent processing ability. Hardware capable of realizing a control unit 11 according to the embodiment may be referred to as the image processing apparatus.

The image processing apparatus 10 includes the control unit 11, a display unit 12, an operation receiving unit 13, a communication interface (IF) 14, and a storage unit 15, for example. The control unit 11 may appropriately include an IC or a plurality of ICs that have a processor (for example, a CPU 11a; this may be an ASIC or cooperation of an ASIC, a CPU, and the like), a ROM 11b, a RAM 11c, and the like, another memory, and the like. The storage unit 15 is a non-volatile storage device such as a hard disk drive (HDD) or a flash memory, for example. The storage unit 15 may be a part of the control unit 11.

The control unit 11 controls behaviors of the image processing apparatus 10 by the processor (CPU 11a) executing arithmetic processing in accordance with a program saved in the ROM 11b, the storage unit 15, or the like using the RAM 11c or the like as a work area. The control unit 11 mounts a program A thereon as one of programs and realizes the respective functions such as a data acquisition unit 20, a file name generation unit 21, and a display control unit 22 in accordance with the program A. The program A is an image processing program that causes the computer to execute processing on document image data that is generated by reading an original document. The program A is an application for executing saving and management of the document image data.

The communication IF 14 is an IF that executes wired or wireless communication with the outside in accordance with a predetermined communication protocol including a known communication standard. In the example in FIG. 1, the image processing apparatus 10 is connected to the scanner 30 via the communication IF 14. It is a matter of course that the image processing apparatus 10 can be connected to an external network via the communication IF 14 or another communication IF, which is not illustrated in the drawing, and the control unit 11 (program A) can upload document image data acquired from the scanner 30 to an external server (not illustrated) through the network (a local area network, the Internet communication network, or the like), for example.

The display unit 12 is a mechanism for displaying visual information and includes, for example, a liquid crystal display (LCD), an organic EL display, or the like. The display unit 12 may have a configuration including a display and a drive circuit for driving the display. The operation receiving unit 13 is a mechanism for receiving user's operations and is realized by a physical button, a touch panel, a mouse, a keyboard, or the like. It is a matter of course that the touch panel may be realized as one of functions of the display unit 12. The display unit 12 and the operation receiving unit 13 may be collectively referred to as an operation panel or the like.

A part of configurations, such as the display unit 12, the operation receiving unit 13, and the storage unit 15, illustrated in FIG. 1 may be peripheral devices that are provided outside the image processing apparatus 10. A system that includes the image processing apparatus 10 and the scanner 30 illustrated in FIG. 1 may be regarded as one invention.

Alternatively, the image processing apparatus 10 and the scanner 30 may be included as a whole in one apparatus in a mode. In the case in which the image processing apparatus 10 and the scanner 30 are included in one apparatus, such a configuration (one apparatus) can be referred to as a reading device or the like. The configuration (one apparatus) including the image processing apparatus 10 and the scanner 30 may be a composite machine that has a plurality of functions as a printer (copy machine), a facsimile, and the like together.

2. FILE SAVING PROCESSING THAT ACCOMPANIES DISPLAY OF FILE NAME

Figure 2:
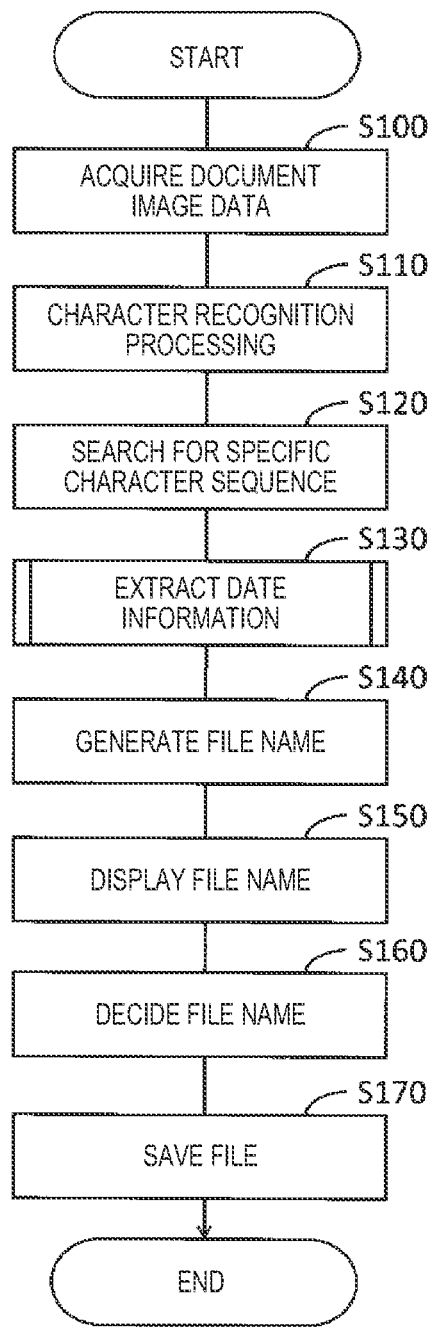
FIG. 2 is a flowchart illustrating file saving processing.

FIG. 2 illustrates, by a flowchart, file saving processing that is executed by the control unit 11 in accordance with the program A.

First, the scanner 30 generates image data by reading an original document that the user arbitrarily sets. In the embodiment, it is assumed that the original document that the user causes the scanner 30 to read is an original document in which at least characters are described. The original document is a receipt, an invoice, or a contract document, for example. The scanner 30 transmits image data (document image data) as a result of reading the original document to the image processing apparatus 10. The control unit 11 may provide an instruction for starting to read the original document to the scanner 30 via the communication IF 14, and the scanner 30 may start to read the original document in accordance with the instruction for starting to read the original document from the control unit 11.

The control unit 11 (data acquisition unit 20) acquires the document image data transmitted from the scanner 30 as described above via the communication IF 14 (Step S100). Note that the data acquisition unit 20 may acquire the document image data from the storage unit (for example, the storage unit 15) as a transfer destination to which the document image data has been transferred from the scanner 30 rather than acquiring (receiving) the document image data directly from the scanner 30.

The control unit 11 (file name generation unit 21) recognizes character strings included in document image data by executing character recognition (optical character recognition/reader: OCR) on the document image data that is acquired in Step S100 as a target (Step S110). In this case, targets that can be recognized as the character strings included in the document image data are converted into character data (text data). Since the character recognition processing is a known technology, further description will be omitted.

In Step S120, the file name generation unit 21 searches for specific character strings registered in advance from among the character strings (hereinafter, referred to as character strings in data) included in the document image data recognized in Step S110. The specific character strings are character strings that have been registered in a table T. The table T is stored in a storage unit (for example, the storage unit 15) in the image processing apparatus 10. However, the table T may be stored in an external server, and the image processing apparatus 10 may appropriately refer to the table T by accessing the server through the network.

The specific character strings are basically words indicating types of original documents (what are the original document for and what the gist is). For example, a plurality of words that are assumed to be included in documents in the original document and briefly represent types of original documents, such as "invoice", "bill", and "contract", have been registered in advance as specific character strings in the table T. Further, character strings, inputs of which have been received as file names by the control unit 11 that executes the program A in the past, may be registered as a type of the specific character strings in the table T. That is, the control unit 11 that executes the program A can increase the number of specific character strings registered in the table T by registering, in the table T, words (for example, names of shops, facilities, or companies as sources issuing original documents, for example) that the user has input to a file name input section (see the reference numeral 43 in FIG. 3) by operating the operation receiving unit 13 or the like.

In Step S130, the file name generation unit 21 extracts date information from the character strings in data. That is, the file name generation unit 21 extracts, as the date information, numbers of predetermined digits that can be distinguished as representing dates and character strings that include such numbers and slashes "/" or Chinese characters that mean "year", "month", "date", or the like. Although FIG. 2 illustrates a mode in which the extraction of the date information (Step S130) is executed right after the searching for the specific character strings (Step S120), Steps S120 and S130 may be performed in an opposite processing order or may be performed in parallel depending on processing ability of the control unit 11.

Details of Step S130 will be described later with reference to FIG. 4 and the like.

In Step S140, the file name generation unit 21 generates a file name that is applied when the document image data acquired in Step S100 is saved, by using results obtained in Steps S120 and S130. In this case, the file name generation unit 21 generates the file name that includes the specific character strings detected from the character strings in data through the searching in Step S120 and the date information extracted from the character strings in data in Step S130. Specifically, the file name generation unit 21 generates a file name by setting a specific character string as a prefix, setting the date information as a suffix, and coupling the specific character string and the date information with an under bar "_", a hyphen "-", or the like. In a case in which "invoice" is detected as a specific character string from the character strings in data through the searching in Step S120, and "09/30/17" is extracted as the date information in Step S130, for example, a file name "invoice_2017/09/30" can be generated.

In Step S150, the control unit 11 (the display control unit 22) causes the display unit 12 to display the file name generated in Step S140.

Figure 3:
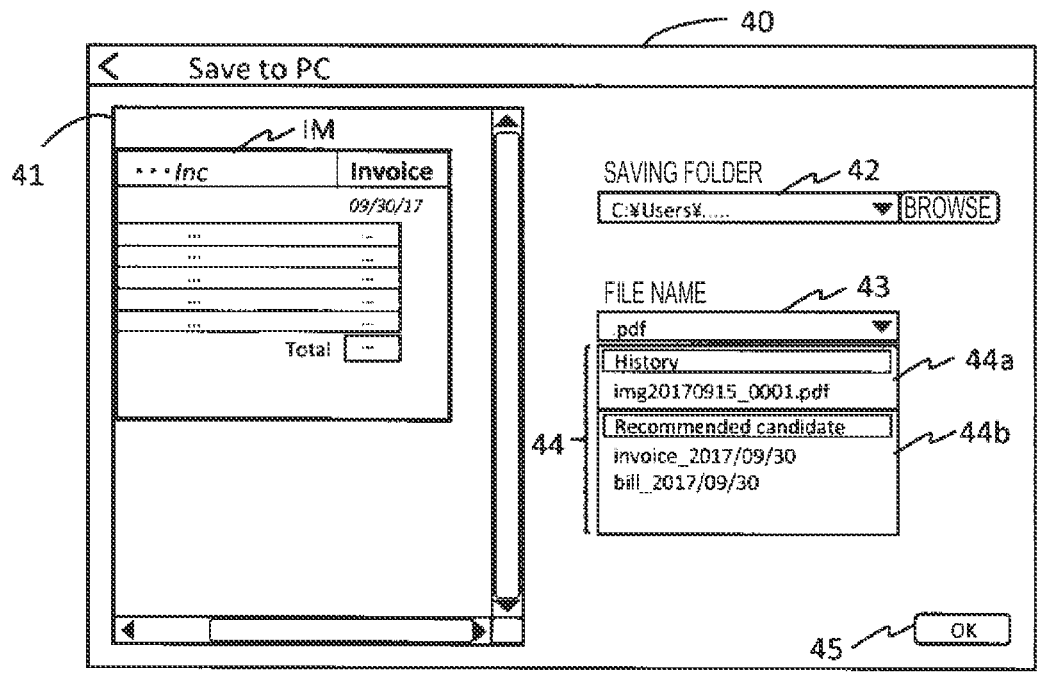
FIG. 3 is a diagram illustrating an example of a file saving setting screen.

FIG. 3 illustrates an example of a file saving setting screen 40 on which the display control unit 22 causes the display unit 12 to perform display in Step S150. The file saving setting screen 40 includes an original document image display section 41, a folder setting section 42, a file name input section 43, and the like. An image IM based on the document image data acquired in Step S100, that is, the original document is displayed in the original document image display section 41, and the user can visually recognize the original document, which the scanner 30 is caused to read, through the original document image display section 41.

The folder setting section 42 is an input section for setting a folder (for example, a folder in the storage unit 15) that serves as a saving destination of the document image data acquired in Step S100. The user can set an arbitrary folder (an existing folder or a newly created folder) in the folder setting section 42 through an operation performed on the operation receiving unit 13 or the like.

The file name input section 43 is an input section for setting the file name that is applied to the document image data acquired in Step S100. The user can set the file name by inputting characters of an arbitrary file name to the file name input section 43 through an operation performed on the operation receiving unit 13 or the like. However, the display control unit 22 displays the file name candidate section 44 in the vicinity of the file name input section 43 as illustrated as an example in FIG. 3 in the embodiment. The file name candidate section 44 includes a first section 44a that is for displaying the file name based on a file name setting history and a second section 44b that is for displaying the file name generated in Step S140. A file name that is set in the file name input section 43 in the past (immediately before) (that has actually been employed as a file name at the time of saving a file), for example, is displayed in the first section 44a. The file name generated in Step S140, for example, "invoice_2017/09/30" as described above is displayed in the second section 44b.

The display control unit 22 sets the file name selected from the file name candidate section 44 in the file name input section 43. That is, the user can set the selected file name in the file name input section 43 merely by performing an operation of selecting the file name from the file name candidate section 44 (clicking, tapping, or the like of the file name that is being displayed in the file name candidate section 44).

The control unit 11 decides the file name in accordance with a user's input provided on the file saving setting screen 40 (Step S160). Specifically, if an operation performed on a predetermined button (an OK button 45 in the example in FIG. 3) in the file saving setting screen 40 is detected, the control unit 11 decides the file name set in the file name input section 43 at that timing as the file name of the document image data acquired in Step S100. That is, the user can apply a file name to a scanned data (document image data) of the original document, which the scanner 30 is caused to read, merely by visually recognizing the file name automatically created in Step S140 in the file name candidate section 44 (second section 44b) and selecting and approving (pressing the OK button 45) the file name.

Then, the control unit 11 saves the document image data acquired in Step S100 as the file to which the file name decided in Step S160 is applied (Step S170). In this case, the file is saved in the folder set in the folder setting section 42 at the timing at which the aforementioned predetermined button (OK button 45) is operated. Such Steps S160 and S170 are executed substantially at the same time. The flowchart in FIG. 2 ends as described above.

Note that the number of file names that are generated in Step S140 and that the display control unit 22 causes the display unit 12 to display in Step S150 is not limited to one. A plurality of specific character strings may be successfully searched from the character strings in data depending on results of searching for the specific character strings in Step S120 in some cases. Therefore, the file name generation unit 21 generates, in Step S140, file names including the specific character strings for the respective specific character strings detected from the character strings in data through the searching in Step S120. Then, the plurality of file names that respectively include different specific character strings can be displayed in Step S150. In the example in FIG. 3, two file names "invoice_2017/09/30" and "bill_2017/09/30" are displayed in the file name candidate section 44 (second section 44b). This represents a case in which two specific character strings "invoice" and "bill" are searched from the character strings in data in Step S120.

No specific character strings may be detected from the character strings in data depending on results of searching for the specific character strings in Step S120 in some cases. Since the file name generation unit 21 cannot generate any file names including the specific character strings in Step S140 in such cases, the file name generation unit 21 may not generate any file names or may generate file names that include the date information extracted in Step S130 without including the specific character strings. Similarly, no date information may be extracted from the character strings in data depending on results of extracting the date information in Step S130 in some cases. Since the file name generation unit 21 cannot generate file names that include date information in Step S140 in such cases, the file name generation unit 21 may not generate the file name and may generate file names that include specific character strings detected through the searching in Step S120 without including date information. In consideration of such exceptional cases, there are probabilities that a file name that includes a specific character string without including date information may be displayed, that a file name that includes date information without including a specific character string may be displayed, and that no file name may be displayed in the second section 44b of the file name candidate section 44 in Step S150.

3. DETAILS OF STEP S130

Figure 4:
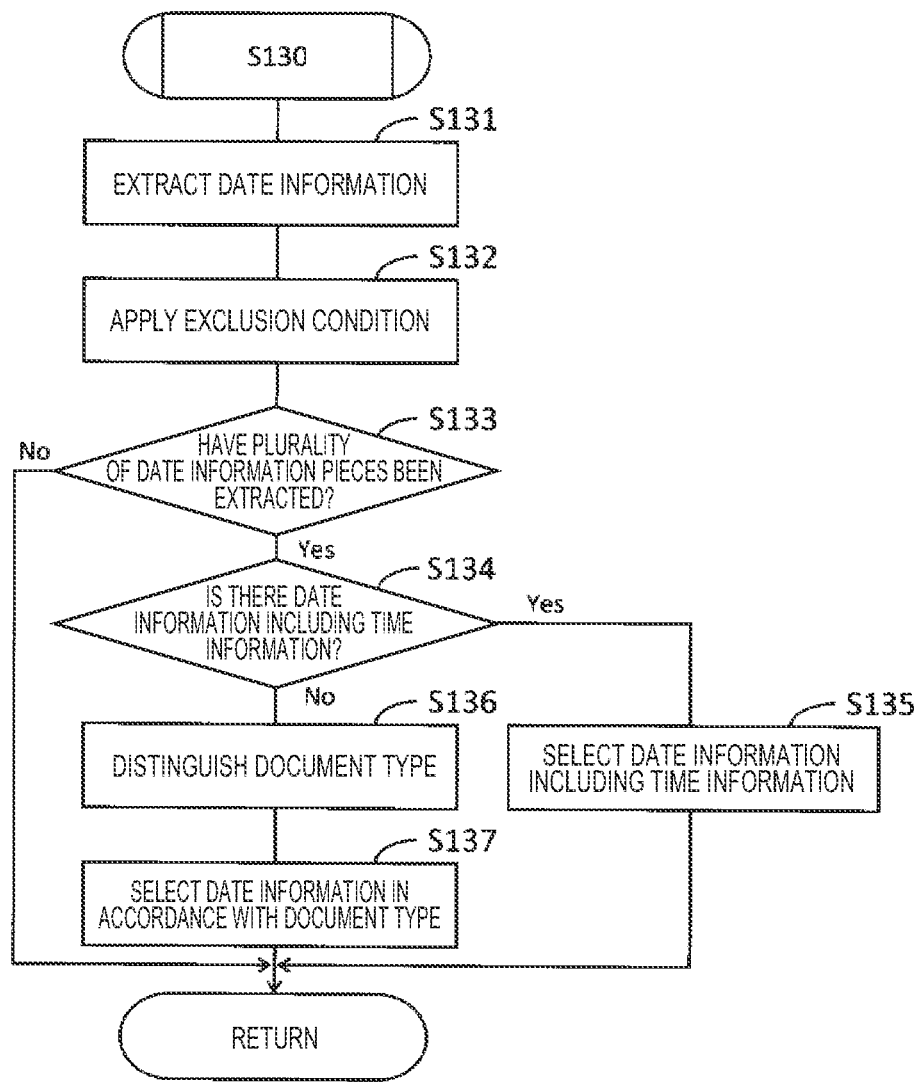
FIG. 4 is a flowchart illustrating details of Step S130.

FIG. 4 illustrates details of Step S130 using a flowchart. In Step S130, the control unit 11 executes extraction of date information from character strings in data first (Step S131). The control unit 11 that executes the flowchart in FIG. 4 in accordance with the program A can be referred to as a date information extracting unit, an issuing date selecting unit, or the like.

In Step S132 the control unit 11 applies a predefined exclusion condition to the date information extracted from the character strings in data in Step S131 and excludes date information corresponding to the exclusion condition from the date information (does not deal with the date information corresponding to the exclusion condition as the date information in the processing in and after Step S133). Although various exclusion conditions can be considered, description along with a character string that limits a period (hereinafter, referred to as a period limiting keyword) is considered to be one of the exclusion conditions. The period limiting keyword means a word that has a meaning of limiting a period, such as "until", "expire", or "before", for example. Various kinds of date information related to a campaign of a product, advertisement, and an expiration period of points, for example, are often described in addition to the issuing date of the original document in a receipt or the like that is the original document. Such date information that does not correspond to the issuing date of the original document is accompanied by period limiting keywords in many cases.

It is assumed that period limiting keywords are registered in advance in the table T separately from the aforementioned specific character strings, for example. The control unit 11 excludes date information described along with the period limiting keywords in the character strings in data from the date information. The description of the date information along with the period limiting keywords in the character strings in data indicates, for example, a case in which a period limiting keyword and date information are present in one line or two continuous lines in the character strings in data.

In the embodiment, date information that is newer than a date and time of generation of the document image data acquired in Step S100 is regarded as one of the exclusion conditions. The date and time of generation of the document image data can be distinguished from property information of the document image data, for example. The document image data is generated by the scanner 30 reading the original document after the original document is issued. Therefore, date information that indicates a newer (future) date than the date and time of generation of the document image data cannot correspond to the issuing date of the original document. Therefore, the control unit 11 excludes, from the date information, date information that is newer than the date and time of generation of the document image data from among date information pieces extracted from the character strings in data.

In Step S133, the control unit 11 determines whether or not a plurality of date information pieces have been extracted from the character strings in data. That is, it is determined whether or not there are a plurality of date information pieces that have successfully been extracted from the character strings in data in Step S131 and that remain without having been excluded as a result of applying the exclusion condition in Step S132. The control unit 11 moves on to Step S134 in a case in which it is determined that a plurality of date information pieces have been extracted from the character strings in data (Yes in Step S133) or ends Step S130 (FIG. 4) in a case in which it is determined that a plurality of date information pieces have not been extracted from the character strings in data in Step S133 (No in Step S133).

Ending Step S130 after "No" determination in Step S133 corresponds to either a case in which one date information piece has been extracted from the character strings in data or a case in which no date information has been able to be extracted from the character strings in data. In a case in which one date information piece is extracted from the character strings in data as a result of Step S130, a file name including the extracted date information is generated (Step S140) and is then displayed on the display unit 12 (Step S150). Processing in and after Step S140 in the case in which no date information has been able to be extracted from the character strings in data as a result of Step S130 is as described above.

In Step S134, the control unit 11 determines whether or not date information including time information is included in the plurality of date information pieces extracted from the character strings in data. If there is date information that is described with a character string "08:28 pm" (for example, in one line or continuous two lines) that can be distinguished as time information on the basis of a combination of a used symbol and numbers or the like, such as "09/30/17. 08:28 pm", for example, from among the plurality of date information pieces extracted from the character strings in data, the control unit 11 determines that there is date information including time information (Yes in Step S134) and moves on to Step S135. Meanwhile, in a case in which it is not determined that there is date information including time information (No in Step S134), the processing proceeds to Step S136.

In Step S135, the control unit 11 selects the date information including the time information as described above from among the plurality of date information pieces extracted from the character strings in data and ends Step S130 (FIG. 4). Date information describing not only a date but also a time in detail in an original document (a receipt or the like, for example) indicates an issuing date of the original document with a high probability. Therefore, in a case in which it is possible to extract a plurality of date information pieces from the character strings in data, date information that includes time information is selected with priority in the embodiment. The selection of the date information in Step S135 is processing of fixing the extraction of the date information in Step S130. Therefore, in a case in which Step S130 ends in Step S135, the date information selected in Step S135 is handled as the date information extracted in Step S130 in and after Step S140. Note that even if the date information extracted in Step S130 is date information including time information, the control unit 11 does not need to cause the display unit 12 to display the time information as well in Step S150 (see the second section 44b in FIG. 3).

In a case in which there are a plurality of date information pieces including time information from among a plurality of date information pieces extracted from the character strings in data, the control unit 11 may select all the plurality of date information pieces including the time information in Step S135. However, in view of an actual situation in which old date information is the issuing date of the original document with a high probability from among the date information pieces described in the original document, it is only necessary to select date information that indicates an older date and time from among the date information pieces including time information in Step S135 in a case in which there are a plurality of date information pieces including time information from among the plurality of date information pieces extracted from the character strings in data.

In Step S136 (in a case in which date information including time information has not been selected), the control unit 11 distinguishes the type of the original document on the basis of the document image data acquired in Step S100. There are mainly two methods of distinguishing the type of the original document based on the document image data.

One of the methods is a distinguishing method based on the size of the original document (longitudinal and transverse lengths of the original document) indicated by the document image data. The size of the original document is included in the property information of the document image data. Alternatively, the control unit 11 can recognize the size of the original document on the basis of the number of pixels and resolution (the number of pixels per inch) of the document image data even in a case in which the size of the original document is not included in the property information of the document image data. The control unit 11 distinguishes the type of the original document as a receipt in a case in which the size of the original document indicated by the document image data corresponds to a predetermined receipt size. Since a receipt is a relatively small and long paper in many cases, the control unit 11 defines a range of the receipt size (ranges of the respective longitudinal and transverse lengths) in advance and distinguishes the type of the original document as a receipt in a case in which the size of the original document falls within the defined range of the receipt size.

However, the control unit 11 distinguishes the type of the original document as a receipt type 2 in a case in which the size of the original document indicated by the document image data corresponds to a so-called letter size. The aforementioned range of the receipt size defines a range of a size that is different from the letter size. Therefore, it is possible to state that the control unit 11 distinguishes the type of the original document as a receipt type 1 in a case in which the size of the original document falls within the aforementioned range of the receipt size, and the control unit 11 distinguishes the type of the original document as a receipt type 2 in a case in which the size of the original document corresponds to the letter size. In addition, a receipt issued by an accommodation facility such as a hotel is assumed as the receipt type 2.

The other method of distinguishing the type of the original document based on the document image data is a distinguishing method based on character strings in data. The control unit 11 distinguishes the type of the original document as a receipt type 2 in a case in which a word such as a "hotel", for example or other predetermined keyword in relation to an accommodation facility has successfully been searched from the character strings in data. In other cases, the control unit 11 can distinguish (estimate) that the type of the original document is the receipt type 1, an invoice, a contract document, or the like in accordance with a result of searching for the aforementioned specific character string in the character strings in data.

In Step S137, the control unit 11 selects date information in accordance with the type of the original document distinguished in Step S136 from among the plurality of date information pieces extracted from the character strings in data and ends Step S130 (FIG. 4). The selection of the date information in Step S137 is also processing of fixing the extraction of the date information in Step S130. Therefore, in a case in which Step S130 ends in Step S137, the date information selected in Step S137 is handles as the date information extracted in Step S130 in and after Step S140.

A specific example of Step S137 will be described. The control unit 11 selects either older date information or newer date information from among the date information pieces extracted from the character strings in data in accordance with the type of the original document. In a case in which the type of the original document is a receipt (a receipt type 1), the control unit 11 selects older date information with priority from among the plurality of date information pieces. This is for avoiding selection of a future date as compared with the issuing date of such a receipt since a date related to a campaign of a product, advertisement, an expiration period of points, or the like (the date in the future as compared with the issuing date of the receipt) is described in the receipt as described above. Meanwhile, in a case in which the type of the original document is a receipt type 2, the control unit 11 selects, with priority, new date information from among the date information pieces. This is because it is possible to select a date on which the original document has actually been issued, that is, a check-out date by selecting newer date information with priority although check-in date information and check-out date information are basically described in a receipt of an accommodation facility. Note that in a case in which it is determined that the type of the original document does not correspond to both the receipt type 1 and the receipt type 2 in Step S136, the control unit 11 may select, with priority, older date information from among the plurality of date information pieces in Step S137.

As can be understood from the above description, the date information extracted from the character strings in data at the timing at which Step S130 (FIG. 4) ends is date information that indicates the issuing date of the original document with a high probability. In other words, the control unit 11 selects and extracts date information indicating the issuing date of the original document from the character strings in data. Note that in a case in which one date information piece has been able to be extracted from the character strings in data (in a case in which "No" determination has been made in Step S133 and Step S130 has ended), the control unit 11 regards the extracted date information as the issuing date of the original document. Therefore, it is possible to state that the control unit 11 selects the issuing date of the original document by extracting the date information from the character strings in data in Step S130. Also, the date information extracted from the character strings in data at the timing at which Step S130 ends is date information that does not correspond to the aforementioned exclusion condition (see Step S132). That is, in Step S130, the control unit 11 excludes date information described along with a period limiting keyword from options that are finally extracted and excludes date information that is newer than the date and time of generation of the document image data from options that are finally extracted. In this manner, it is possible to avoid selection of inappropriate date information that corresponds to the issuing date of the original document with a significantly low probability as the issuing date of the original document. Although Step S132 is not essential in the flowchart in FIG. 4, it is possible to more appropriately select the issuing date of the original document by executing the step.

4. CONCLUSION

According to the embodiment, the image processing apparatus 10 includes the control unit 11 that acquires the document image data that is generated by reading the original document (Step S100) and recognizes character strings (character strings in data) included in the document image data through character recognition as described above. The control unit 11 searches for a specific character string registered in advance in the table T from among the character strings in data (Step S120) and causes the display unit 12 to display the file name including the specific character string detected through the searching as the file name of the document image data (Steps S140 and S150). With this configuration, the control unit 11 presents the file name including the specific character string detected through the searching to the user. Therefore, the user can set an appropriate file name for the document image data merely by performing a predetermined operation of approving the file name represented (displayed on the display unit 12). With this configuration, it is possible to present an appropriate file name (a file name including the specific character string) for the original document regardless of a document form of the original document and the size of the original document and to reduce time and efforts of the user.

According to the embodiment, words that are assumed to be included in the character strings in data of the original document (a receipt, an invoice, a contract document or the like) and briefly represent types of the original document, such as "invoice", "bill", or "contract", for example, and character strings that the user has input as file names in the past are registered in the table T as specific character strings. As a result, the control unit 11 can present, to the user, an appropriate file name that reflects the type of the original document and tendency of naming files by the user in the past by searching for the specific character strings from the character strings in data and make it simple to apply an appropriate name to the document image data. Also, it is possible for the user to simply find a desired file when the user searches for a file saved in the storage unit 15 or the like by such appropriate file names that reflect types of original documents and tendency of naming files by the user in the past being applied to and saved with the document image data.

According to the embodiment, the control unit 11 extracts the date information from the character strings in data (Step S130) and causes the extracted date information to be included in the file name to be displayed (Steps S140 and S150). With the configuration, the control unit 11 can present, to the user, not only the specific character string detected through the searching from the character strings in data but also a more appropriate file name including the date information extracted from the character strings in data, that is, the issuing date of the original document, and the control unit 11 can thus simplify the naming of the document image data.

Further, according to the embodiment, the date information including time information from among the plurality of date information pieces are selected as the issuing date of the original document in a case in which the plurality of date information pieces are extracted from the character strings in data in Step S130 that the control unit 11 executes. That is, in the case in which the plurality of date information pieces are extracted from the character strings in data (Yes in Step S133), the control unit 11 selects the issuing date from among the plurality of date information pieces. In a case in which the date information including the time information is included in the plurality of date information pieces as a priority matter at this time (Yes in Step S134), the date information including the time information is selected (Step S135). In this manner, it is possible to select date information that corresponds to the issuing date of the original document with a relatively high probability as the issuing date of the original document when the plurality of date information pieces are extracted from among the character strings in data.

According to the embodiment, the control unit 11 distinguishes the type of the original document on the basis of the document image data (Step S136) in a case in which the date information including the time information is not selected (No in Step S134), and the control unit 11 selects the date information from among the plurality of date information pieces in accordance with the type of the original document (Step S137). In this manner, it is possible to appropriately select the issuing date of the original document from among the date information pieces in accordance with the type of the original document even in a case in which there is no date information including time information in the plurality of date information pieces extracted from the character strings in data or even in a case in which date information including time information, if any, corresponds to the exclusion condition.

5. MODIFICATION EXAMPLES

The embodiment is not limited to the aforementioned mode and can include various modification examples. Hereinafter, a plurality of modification examples included in the embodiment will be described.

Figure 5A:
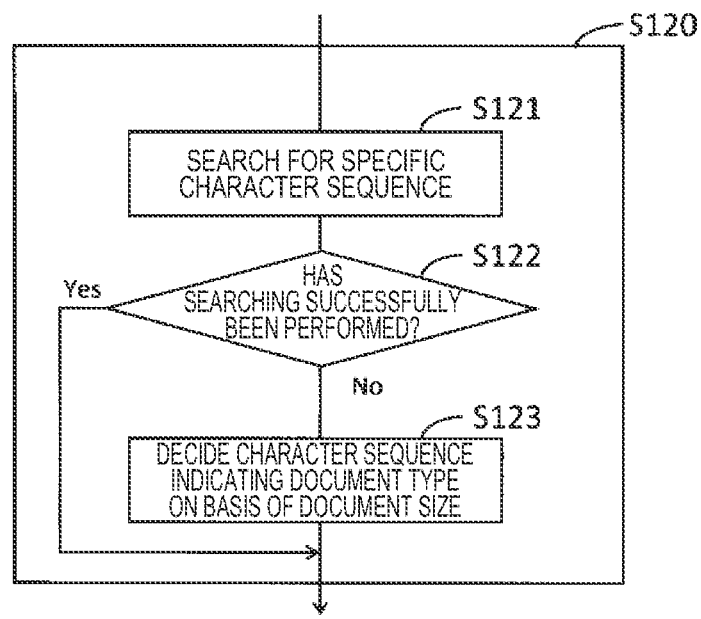
Figure 5B:
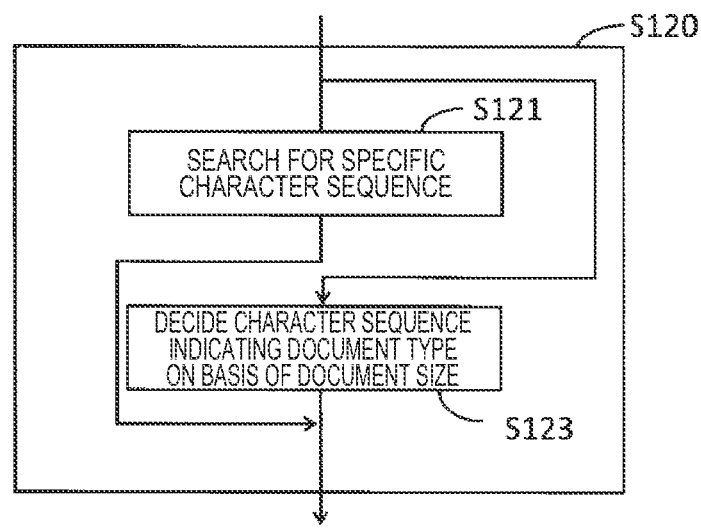
FIG. 5B is a diagram illustrating another modification example of Step S120.

FIG. 5A illustrates a modification example of Step S120 (FIG. 2). FIG. 5B illustrates another modification example of Step S120 (FIG. 2). In the example in FIG. 5A, Step S120 includes the respective Steps S121, S122, and S123. In the example in FIG. 5B, Step S120 includes the respective Steps S121 and S123. Step S121 is the same processing as that in S120 that has been described hitherto.

In the example in FIG. 5A, the control unit 11 branches processing depending on whether or not a specific character string have been able to be detected from the character strings in data as a result of searching for the specific character string in Step S121 after executing Step S121 (Step S122). That is, in a case in which one or more specific character strings have been able to be detected from the character strings in data (Yes in Step S122), the control unit 11 ends Step S120 and moves on to the next step (Step S130 in the example in FIG. 2). Meanwhile, in a case in which no specific character string has been able to be detected from the character strings in data (No in Step S122), the control unit 11 moves on to Step S123, ends Step S123, and then moves on to the next step (Step S130 in the example in FIG. 2).

In Step S123, the control unit 11 decides a character string indicating the type of the original document on the basis of the size of the original document. As described above, the control unit 11 can recognize the size of the original document on the basis of the document image data. In a case in which the size of the original document falls within the aforementioned range of the receipt size, the control unit 11 decides a character string "receipt", for example, as the character string indicating the type (the receipt type 1) of the original document. In a case in which the size of the original document corresponds to the letter size, the control unit 11 decides a character string "hotel receipt", for example, as the character string indicating the type (the receipt type 2) of the original document. In a case in which the size of the original document corresponds to a defined name card size, the control unit 11 decides a character string "name card", for example, as the character string indicating the type (name card) of the original document. In this manner, the control unit 11 decides the character string that indicates the type of the original document estimated from the size of the original document in accordance with a predetermined policy (for example, a correspondence between the predefined size of the original document and the character string) in Step S123.

In Step S140 (FIG. 2), the control unit 11 generates the file name to be applied to the document image data acquired in Step S100 when the document image data is saved by using the results in Steps S120 and S130 as described above.

In the configuration in which Step S120 illustrated in FIG. 5A is executed, the control unit 11 generates, in Step S140, a file name including the specific character string detected from the character strings in data through the searching in Step S121 in a case in which the specific character string have successfully been searched from the character strings in data in Step S121. Then, the file name including the specific character string is displayed in Step S150. Meanwhile, in a case in which the specific character string has not been able to be detected from the character strings in data in Step S121, the file name including the character string decided on the basis of the size of the original document in Step S123 is generated in Step S140, and the file name including the character string decided on the basis of the size of the original document is displayed in Step S150.

In the example in FIG. 5B, the control unit 11 executes both Steps S121 and S123. Therefore, in the configuration in which Step S120 illustrated in FIG. 5B is executed, the control unit 11 generates, in Step S140, the file name including the specific character string detected from the character strings in data through the searching in Step S121 in a case in which the specific character string has successfully been searched from the character strings in data in Step S121. Further, the control unit 11 also generates, in Step S140, a file name including the character string decided on the basis of the size of the original document in Step S123 regardless of whether or not the specific character string has successfully been searched from the character strings in data in Step S121. As a result, the file name including the specific character string and the file name including the character string decided on the basis of the size of the original document are basically displayed in Step S150.

In the example in FIG. 5A, the control unit 11 can present an appropriate file name to the user when the document image data is saved even if the specific character string has not successfully been searched from the character strings in data. In the example in FIG. 5B, the control unit 11 can present more options of an appropriate file name to the user when the document image data is saved.

Step S130 (FIG. 4) has been described hitherto as a part of the flowchart in FIG. 2, that is, a part of the process of applying a file name to document image data and saving the document image data with the file name. However, the content described in Step S130 (FIG. 4) can also be understood separately from the flowchart in FIG. 2. For example, the control unit 11 may display, on the display unit 12, the date information decided as the issuing date of the original document in Step S130 as the issuing date of the original document.

Figure 6:
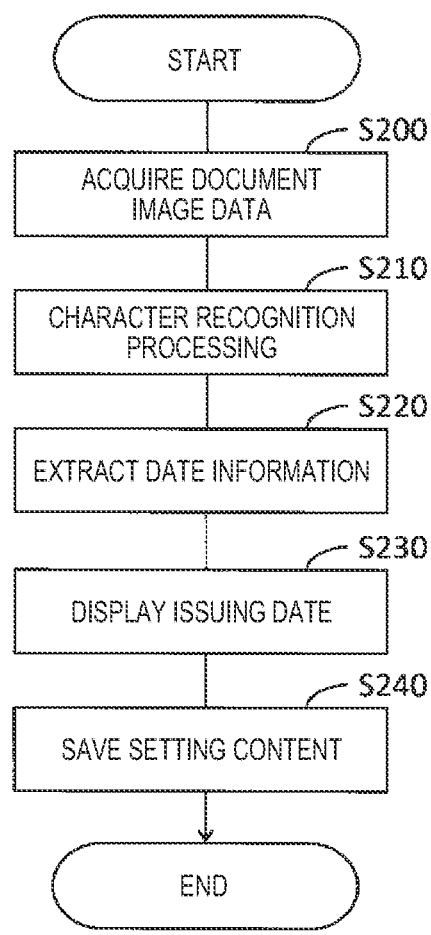
FIG. 6 is a flowchart illustrating issuing date decision display processing.

FIG. 6 illustrates, as a flowchart, issuing date decision and display processing as a modification example of the embodiment that the control unit 11 executes in accordance with the program A.

Since Steps S200, S210, and S220 are the same processing as Steps S100, S110, and S130 described above, description thereof will be omitted.

In Step S230, the control unit 11 causes the display unit 12 to display the date information extracted in Step S220 (=S130, FIG. 4) (the date information selected as the issuing date of the original document) as the issuing date of the original document.

Figure 7:
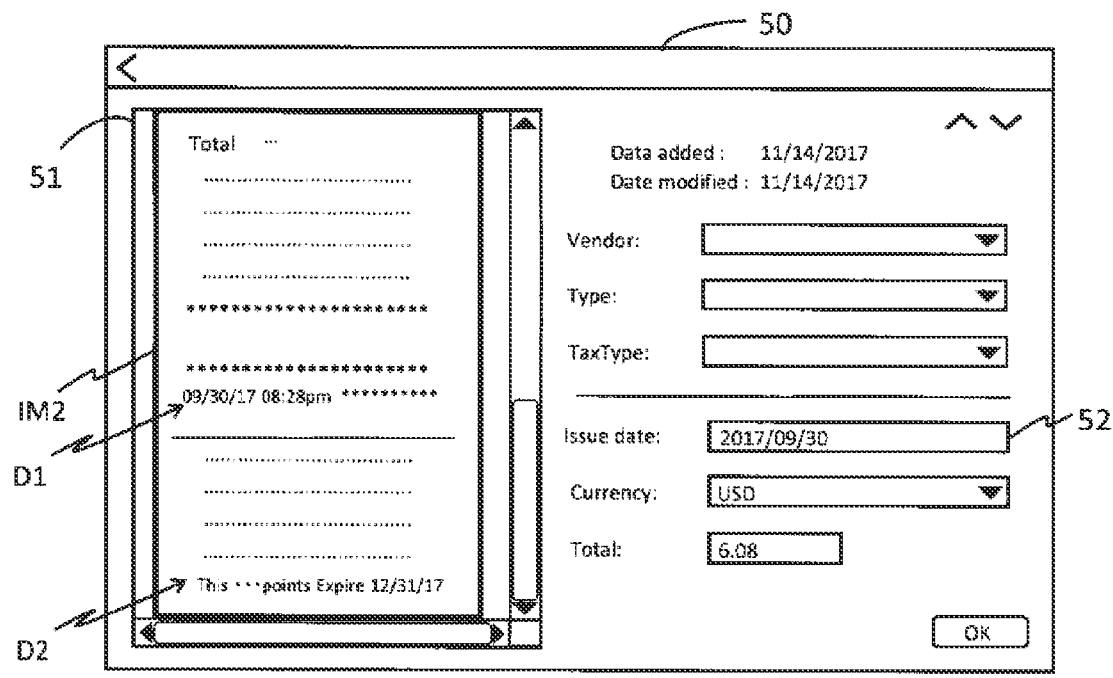
FIG. 7 is a diagram illustrating an example of a scanning data management screen.

FIG. 7 illustrates an example of the scanning data management screen 50 that the control unit 11 (display control unit 22) causes the display unit 12 to display in Step S230. In the example in FIG. 7, the scanning data management screen 50 includes an original document image display section 51 on the left side of the screen. An image IM2 based on the document image data acquired in Step S200, that is, the original document (for example, a receipt) is displayed in the original document image display section 51, the user can visually recognize the original document that the scanner 30 is caused to read through the original document image display section 51. In the example in FIG. 7, the scanning data management screen 50 includes a plurality of setting input sections on the right side of the screen. The user can perform inputs based on the content of the original document to the respective setting input sections.

In a case of displaying such a scanning data management screen 50, the control unit 11 causes the date information decided as the issuing date of the original document in Step S220 to be displayed in an issuing date input section 52 that is one of the plurality of setting input sections. In the example in FIG. 7, date information is present at each location in the original document as represented by the reference numerals D1 and D2 although the entire original document is not displayed in the original document image display section 51. In the date information, date information D2 is not extracted as date information (not selected as the issuing date of the original document) as a result of Step S220 (=S130, FIG. 4) since the date information D is accompanied with a period limiting keyword "expire". Meanwhile, the date information D1 is extracted as the date information (selected as the issuing date of the original document) as a result of Step S220 (=S130, FIG. 4) since the date information D1 does not include time information. Therefore, the date "2017/09/30" is automatically displayed as the issuing date of the original document in the issuing date input section 52 in the example in FIG. 7.

In a case in which a predetermined operation of ending a setting input to the scanning data management screen 50 is received from the user, for example, the control unit 11 saves current setting content in the respective setting input sections on the scanning data management screen 50 along with the document image data acquired in Step S200 (Step S240), closes the scanning data management screen 50, and ends the flowchart in FIG. 6. The user can edit the setting content saved along with the document image data as needed by opening the scanning data management screen 50 again.

Note that FIGS. 3 and 7 illustrate only examples of display modes of the file name and the issuing date of the original document in Step S150 (FIG. 2) and Step S230 (FIG. 6). The display modes in Step S150 (FIG. 2) and Step S230 (FIG. 6), for example, various layouts and designs on the screen that the display unit 12 is caused to display and various purposes and roles of the screen that the display unit 12 is caused to display are considered.

Further, methods of generating and displaying the file name according to the embodiment can also be applied to generation and display of a folder name of a folder for saving the file. That is, the control unit 11 searches for a specific character string registered in advance from the character strings in data and causes the display unit 12 to display the folder name including the specific character string detected through the searching as a name of a folder that is a saving destination of the document image data (in the vicinity of the folder setting section 42, for example). The control unit 11 may extract date information from the character strings in data and causes the folder name to be displayed to include the extracted date information. The user can simply decide the folder name of the folder (newly created folder) that is a saving destination when the document image data is saved in the file, by selecting the folder name displayed on the display unit 12 as described above. 1.

What is claimed is:

1. An image processing apparatus comprising:
a processor that acquires document image data that is generated by reading an original document and recognizes character strings that are included in the document image data through character recognition, wherein
the processor selects, as an issuing date of the original document, date information from among a plurality of date information pieces in a case in which the plurality of date information pieces is extracted from the character strings, and
the processor excludes extraction of date information that is newer than date of generation of the document image data.

2. The image processing apparatus according to claim 1, wherein the processor distinguishes time information in one line or continuous two lines.

3. The image processing apparatus according to claim 2, wherein the date information includes the time information.

4. The image processing apparatus according to claim 1, wherein the processor distinguishes time information on the basis of a combination of a used symbol and numbers.

5. The image processing apparatus according to claim 4, wherein the date information includes the time information.

6. The image processing apparatus according to claim 1, wherein the processor does not extract date information that is described along with a character string that limits a period.

7. The image processing apparatus according to claim 1, wherein the processor causes a display unit to display a file name that includes the issuing date as a file name of the document image data.

8. A non-transitory computer readable medium storing computer-executable instructions which, when executed by a processor of an image processing apparatus, cause the processor to execute a process on document image data that is generated by reading an original document, the process comprising:

executing a control function of recognizing character strings that are included in the document image data through character recognition, wherein the control function selects, as an issuing date of the original document, date information from among a plurality of date information pieces in a case in which the plurality of date information pieces is extracted from among the character strings, and the control function excludes extraction of date information that is newer than date of generation of the document image data.

\* \* \* \* \*